Sept. 1, 1970   E. G. FOSTER ET AL   3,526,685
PROCESS FOR THE PRODUCTION OF FOAMED GYPSUM CASTINGS
Filed Sept. 22, 1967
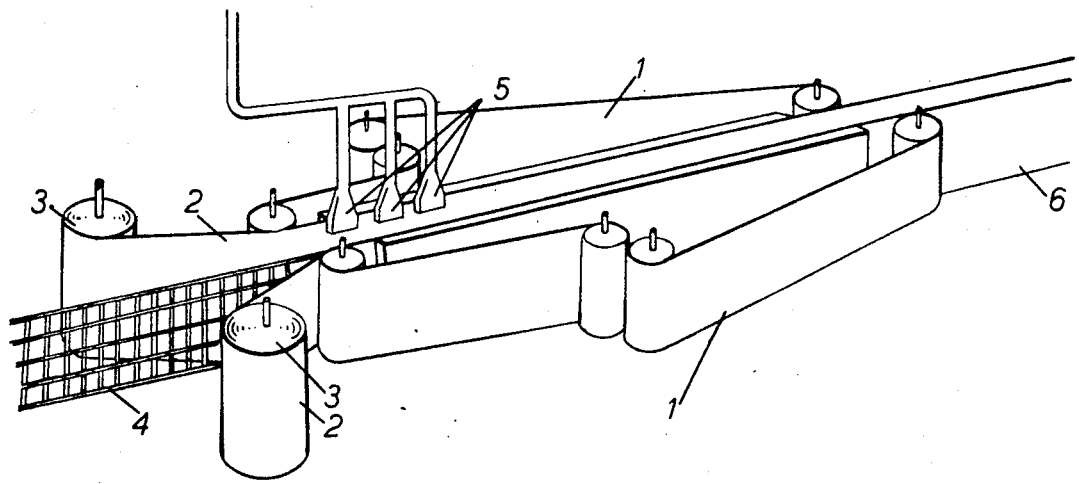
Inventors
EDWARD GRAHAM FOSTER
MARTIN S. BLOOM 3,526,685
PROCESS FOR THE PRODUCTION OF FOAMED
GYPSUM CASTINGS
Edward Graham Foster and Martin S. Bloom, Norton-on-Tees, England, assignors to Imperial Chemical Industries Limited, London, England, a corporation of Great Britain
Filed Sept. 22, 1967, Ser. No. 669,835
Claims priority, application Great Britain, Oct. 20, 1966, 46,921/66
Int. Cl. B29d 27/04; C04b 11/02, 21/02
U.S. Cl. 264—42         4 Claims

ABSTRACT OF THE DISCLOSURE

A process for producing a foamed gypsum casting by mixing with a water slurry of calcium sulphate hemihydrate, sulfuric acid and calcium carbonate to generate carbon dioxide in situ, wherein the casting mold has internal faces lined with a polyolefin-coated material, e.g. polyethylene coated on paper.

This invention relates to the production of foamed gypsum castings from calcium sulphate α- or β-hemihydrate, and constitutes an improvement in or modification of the invention described and claimed in our U.S. Pat. 3,454,688, issued July 8, 1969.

In our said U.S. Pat. 3,454,688, issued July 8, 1969, we have described and claimed a process for producing quick-setting lightweight foamed gypsum castings requiring little or no drying, which comprises the steps of mixing calcium sulpate hemihydrate with water to form a pourable or pumpable slurry, preferably of approximately plastering consistency, introducing into said slurry, or into the slurrying water, calcium carbonate and sulphuric acid in quantities sufficient to generate sufficient foam-forming carbon dioxide gas in situ within said slurry to reduce the density of the final product to within desired limits, the sulphuric acid being added in sufficient excess to accelerate setting of the slurry to within desired limits, and casting the foaming slurry, either continuously or batchwise, in a mould or the like. The foaming slurry may be introduced continuously into one end of a substantially vertical continuous mould having a horizontal endless track for a base and a pair of vertical, spaced, parallel endless tracks for sides, the speed and/or the length of the endless tracks being so selected that the slurry has set by the time it issues from the other end of the mould. Alternatively the foaming slurry may be introduced continuously into one end of a substantially horizontal continuous mould having a pair of horizontal, spaced parallel endless tracks for top and base, the speed and/or the length of the endless tracks being so selected that the slurry has set by the time it issues from the other end of the mould.

In our said U.S. Pat. 3,454,688 referred to above, we have further described the production of laminated products comprising a foamed gypsum slab covered on one or both faces with a facing material such as paper, for example by running two continuous lengths of paper through the mould, from off rolls, in contact with opposite surfaces of the mould, and injecting the foaming slurry therebetween.

We have now found that an improved product is obtained if the facing material is a non-porous polyolefin-coated material, in particular polyethylene-coated paper, used with the polyolefin coating adjacent the foaming slurry; after peeling off this paper from the cast product, the latter is found, surprisingly, to have a fair face of solid plaster approximately one-sixteenth of an inch thick which is hard and knock-resistant. We are thus enabled to make a fair-faced, foamed panel in a single operation as opposed to first making the foamed panel and subsequently plastering its faces.

The present invention accordingly provides a process for producing foamed gypsum castings which comprises the steps of mixing calcium sulphate hemihydrate with water to form a pourable or pumpable slurry, preferably of approximately plastering consistency, introducing into said slurry, or into the slurrying water, calcium carbonate and sulphuric acid in quantities sufficient to generate sufficient foam-forming carbon dioxide gas in situ within said slurry to reduce the density of the final product to within desired limits, the sulphuric acid being added in sufficient excess to accelerate setting of the slurry to within desired limits, and casting the foaming slurry, either continuously or batchwise, in a mould having at least one internal face lined with non-porous polyolefin-coated material, the polyolefin coating being at least on that side of the material adjacent the foaming slurry.

The material is preferably paper; the polyolefin coating is preferably a polyethylene coating, in particular a corona-discharged polyethylene coating.

The polyolefin-coated paper may be stripped off the casting immediately it has set, or it may be left in position until the casting is required for use.

In the case of continuous casting, it is convenient to use a vertical continuous mould or a horizontal continuous mould such as those described in our U.S. Pat. 3,454,688 referred to above. A suitable vertical continuous mould is illustrated diagrammatically in the accompanying drawing, and consists of a pair of vertical, spaced, parallel endless belts 1 for its sides, with a horizontal endless belt (not illustrated) for its base. As illustrated, two continuous lengths of polyolefin-coated paper 2 are run through the mould, off reels 3, in contact with the opposite vertical endless belts 1 and with their polyolefin-coated surfaces facing inwardly, but it will be appreciated that a single continuous length of polyolefin-coated paper may be used in case where it is desired to have a fair-face on only one side of the casting. Preferably, one or more reinforcements, such as wires, rods or the like, are inserted in the mould between the vertical endless belts; as illustrated such a reinforcement may comprise a continuous sheet of wire mesh 4, which may conveniently be run off a reel, but it is to be understood that there may be two or more such sheets. Foaming hemihydrate slurry is injected into the end of the mould by means of a number of injection nozzles 5, and has set by the time it issues from the other end of the mould. If desired, the polyolefin-coated paper may be stripped off the casting 6 as it issues from the mould, and the casting is cut into suitable lengths.

We claim:
1. In a process for producing foamed gypsum castings, which comprise the steps of mixing calcium sulphate hemihydrate with water to form a pourable, pumpable slurry, generating foam-forming carbon dioxide gas in situ within said slurry by the reaction of calcium carbonate and sulphuric acid in quantities sufficient to reduce the density of the final product to within desired limits, the sulphuric acid being used in sufficient excess to accelerate setting of the slurry to within desired limits, and casting the slurry in a mould, the improvement wherein the said mould has at least one internal face lined with a non-porous polyolefin-coated material, the polyolefin-coating being at least on that side of the material adjacent the framing slurry.
2. A process as claimed in claim 1, wherein said polyolefin-coating is a polyethylene-coating.

3. A process as claimed in claim 2, wherein said polyethylene-coating is a corona-discharged polyethylene-coating.

4. A process as claimed in claim 1, wherein said material is paper.

References Cited

UNITED STATES PATENTS

| | | | |
|---|---|---|---|
| 529,535 | 11/1894 | Smith | 25—42 |
| 2,288,559 | 6/1942 | Ward | 264—338 XR |
| 2,321,638 | 6/1943 | Williams | 264—338 XR |
| 3,214,793 | 11/1965 | Vidal | 264—51 XR |
| 3,424,607 | 1/1969 | Coscia | 264—338 XR |

FOREIGN PATENTS

| | | |
|---|---|---|
| 11,443 | 9/1890 | Great Britain. |
| 16,921 | 11/1891 | Great Britain. |

OTHER REFERENCES

Welch, F. C., "Effects of Accelerators and Retarders on Calcined Gypsum," in Journal of the American Ceramic Society, vol. 6, No. 11, November 1923, pp. 1197-1207.

PHILIP E. ANDERSON, Primary Examiner

U.S. Cl. X.R.

264—338, 213; 18—4; 106—122, 87, 110; 25—42